Aug. 26, 1952 W. G. HOELSCHER 2,608,109
HAND OR POWER TRANSMITTING APPARATUS
Filed Sept. 13, 1948 7 Sheets-Sheet 1

INVENTOR.
William G. Hoelscher
BY
Wood, Arey, Herron & Evans
Attorneys

Aug. 26, 1952  W. G. HOELSCHER  2,608,109
HAND OR POWER TRANSMITTING APPARATUS
Filed Sept. 13, 1948  7 Sheets-Sheet 4

INVENTOR.
William G. Hoelscher
BY
Wood, Arey, Herron & Evans
Attorneys

Aug. 26, 1952 W. G. HOELSCHER 2,608,109
HAND OR POWER TRANSMITTING APPARATUS
Filed Sept. 13, 1948 7 Sheets-Sheet 5

INVENTOR.
William G. Hoelscher
BY
Wood, Arey, Herron & Evans
Attorneys.

Fig. 14

Patented Aug. 26, 1952

2,608,109

UNITED STATES PATENT OFFICE 2,608,109

HAND OR POWER TRANSMITTING APPARATUS

William G. Hoelscher, Cincinnati, Ohio, assignor to The American Tool Works Company, Cincinnati, Ohio, a corporation of Ohio Application September 13, 1948, Serial No. 48,955

10 Claims. (Cl. 74—625)

This invention relates to lathes and particularly to improvements by which control of the lathe is centralized to permit the operator to regulate the headstock and traverse the carriage electrically without leaving the carriage. Although the lathe is equipped with the customary mechanical carriage feed mechanism, it additionally incorporates a traverse motor which operates independently to permit the carriage to be traversed without operation of the mechanical feed.

In general, the improved lathe incorporates a headstock having a mechanical speed change transmission for spindle drive, regulated by gear shift levers mounted on the headstock, and a feed box unit having control levers for regulating the longitudinal carriage feed rate. In setting up the machine for a particular job, the operator selects the proper spindle speed and carriage feed rate in the usual fashion, dependent upon work diameter, material, type of cutting tool, and other factors. After the proper spindle speed and carriage feed are established, the cutting operation is controlled at the carriage by remote control, making it unnecessary for the operator to leave the carriage to start, stop and reverse the headstock spindle and permitting him to traverse the carriage in either direction without disturbing feed box setting. Numerous trips to the headstock thus are eliminated, rendering lathe operation more convenient and efficient, particularly as applied to lathes having long beds.

Briefly, the improved lathe incorporates a reversible headstock motor, controlled by an electric feed rail unit which is co-extensive with the lathe bed and in electrical connection with a headstock control switch mounted on the carriage. The control switch is in electrical connection with the feed rail by means of a collector unit connected to and movable with the carriage. The carriage further incorporates an independent, reversible traverse motor, controlled by a second switch mounted on the carriage, likewise in electrical connection and with and powered by the feed rail. The carriage rapid traverse switch is interlocked with a carriage lever which couples the mechanical carriage feeding apparatus in such manner that one system is made inoperative when the other is operative, to prevent both drives from being coupled simultaneously.

The objects of the invention have been to provide an independent electric motor drive system combined with the mechanical carriage feed mechanism in such manner that the electric traverse motor may be operated to traverse the carriage in either direction without interfering with the setting of the mechanical carriage feed apparatus, and to provide an interlock mechanism which also uncouples the carriage handwheel automatically when the motor drive is energized, to prevent dangerous spinning of the wheel. By virtue of the electric traverse apparatus, the feed box may be adjusted for the proper rate of carriage feed and the operator .s able to traverse the carriage independently of the mechanical feed, in locating the cutting tool with reference to the work and to return the tool to a starting point after completion of a cut without disturbing or reversing the feed box setting.

The headstock motor is controlled by a secondary circuit providing automatic acceleration, overload protection, and electric braking for quickly stopping the spindle when the switch is thrown to "off" position. This circuit is connected by the feed rail unit to the carriage mounted switch, to start, stop, or reverse the motor. The reversible carriage motor is controlled directly by the traverse switch, which is connected by the feed rails to the main power lines. The feed rails are arranged to conduct both the secondary control circuit and the primary power circuit, providing simplicity and permitting the control system to be mounted on the lathe bed adjacent the motor instead of on the carriage. The feed rail structure is disclosed and claimed in the copending application of William G. Hoelscher entitled "Electrical Control System for Lathes," Serial No. 140,608, filed January 26, 1950.

Further object and advantages of the invention will be more fully disclosed with reference to the drawings disclosing a preferred embodiment of the invention.

Figure 1:
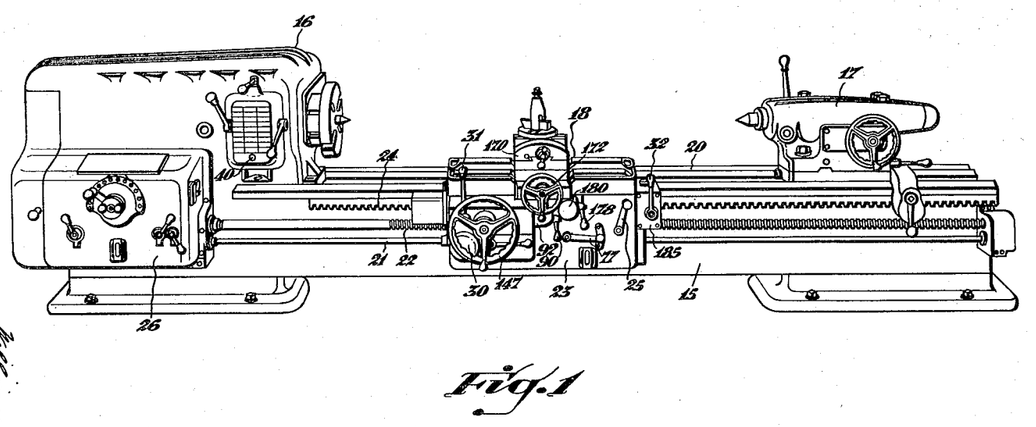
Figure 1 is a general perspective front view of a lathe incorporating the present improvements.

Referring to Figure 1, the lathe incorporates the usual bed 15 having a headstock 16 and a tailstock 17 mounted thereon. A carriage 18 is slidably mounted in the usual manner upon the ways 20 of the bed and the bed is provided with the customary feed rod 21 and lead screw 22 for mechanical carriage feed. The carriage apron 23 includes a gear train which is in driving connection with the feed rod 21 to power the gear train for mechanical translation of the carriage. The carriage gear train meshes with a rack 24 secured to the bed so that power transmitted by the feed rod drives the carriage along the ways.

The carriage also may be fed by means of the lead screw 22 for certain classes of work such as thread chasing. For this purpose a driving engagement is established by means of a split nut (not shown), which is arranged to engage the screw threads when the lead screw lever 25 is actuated.

Figure 2:
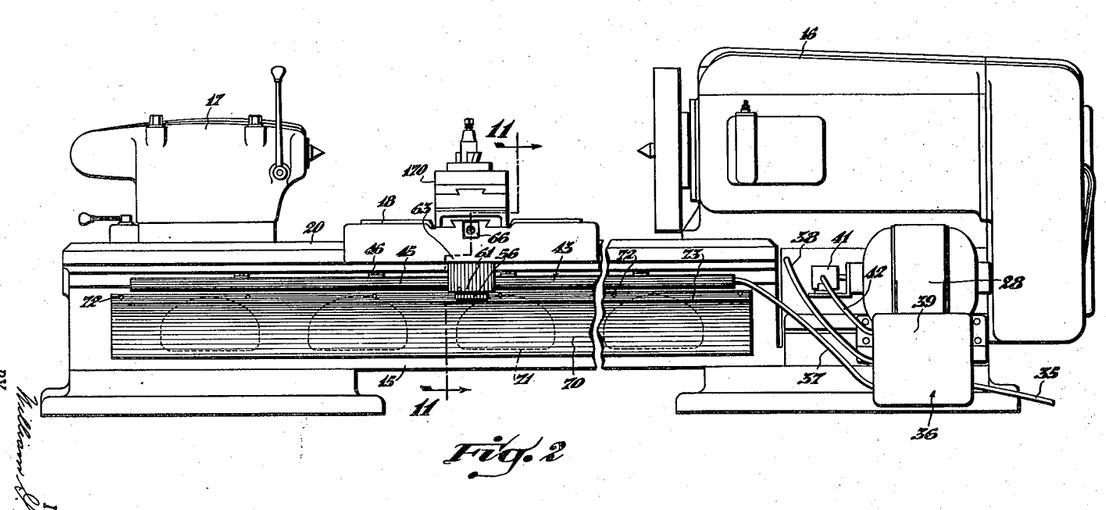
Figure 2 is a general side elevation looking toward the rear of the lathe, illustrating generally the electrical distribution system.

The lead screw and feed rod are driven by a feed box 26 which incorporates a speed change transmission so that the speed and direction of lead screw and feed rod rotation may be regulated. The headstock also incorporates a speed change transmission to regulate spindle speeds. As shown in Figure 2, a reversible electric motor 28 is mounted at the rear of the headstock and is connected to the headstock transmission by means of a multiple V-belt pulley (not shown). The feed box is driven by a gear train (not shown) extending from the headstock transmission.

*General arrangement of electrical components*

Figure 3:
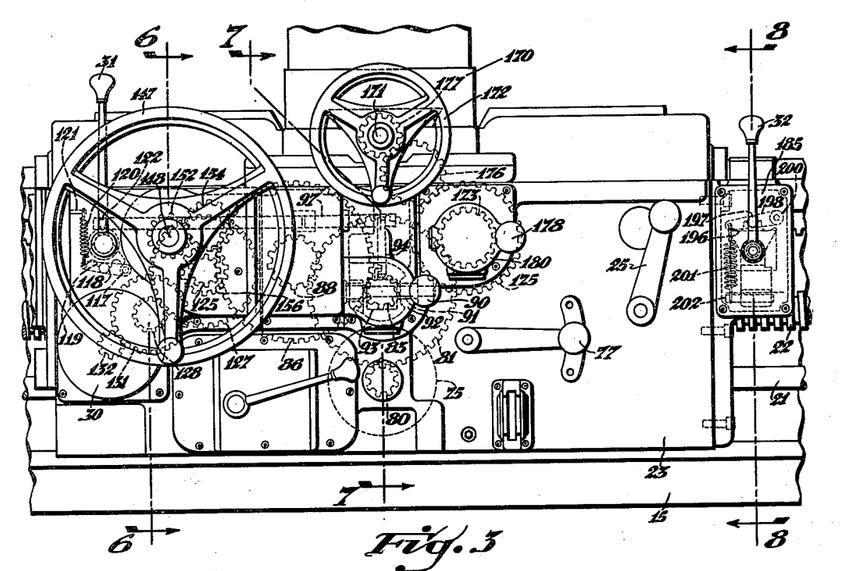
Figure 3 is a fragmentary front elevation of the carriage, illustrating generally the arrangement of the electrical control switches, the apron gear train, and the interlock mechanism for the mechanical and electrical control levers.
Figure 4:
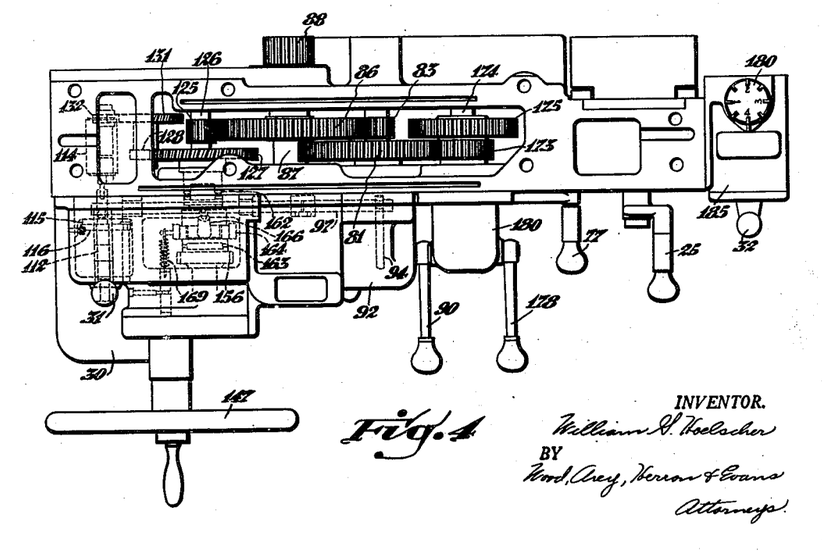
Figure 4 is a top plan view projected from Figure 3, further illustrating the organization disclosed in Figure 3.
Figure 5:
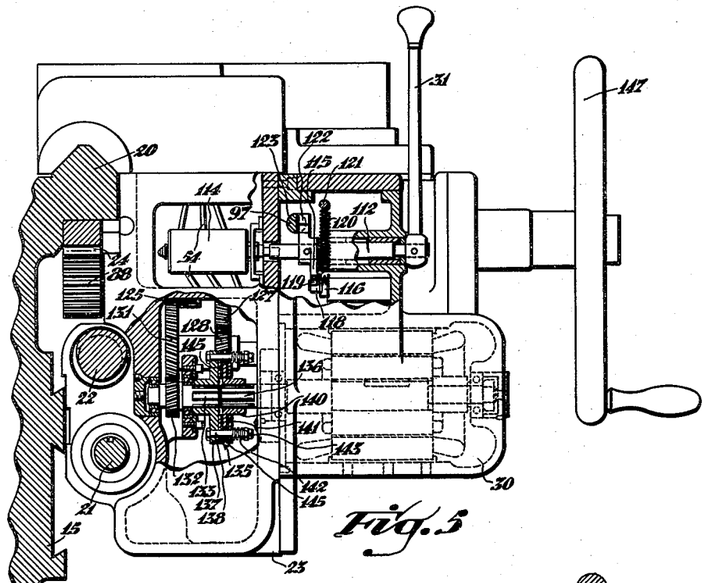
Figure 5 is an enlarged fragmentary end view of the carriage, detailing the carriage motor control switch and a portion of the motor gear train.

In addition to the feed rod and lead screw, the carriage also is provided with an independent rapid traverse motor 30 (Figures 1, 3 and 5). This motor also is reversible and is controlled by means of a lever 31 which is connected to an electrical control switch mounted in the carriage. The main motor 28 for the headstock is controlled remotely by a hand lever 32 mounted at the opposite end of the carriage and in connection with an electrical control switch. By this arrangement the headstock and feed box transmissions may be set up to establish the required spindle speed and carriage feed for a particular job, and the operator is able to control the main headstock motor at the carriage by operation of lever 32. Additionally, he is able to traverse the carriage in either direction independently of the feed rod and lead screw by disengaging the mechanical drive and throwing the lever 31 to either side of its "off" position to energize the carriage traverse motor 30. The lever 31 preferably is arranged to swing in the direction of carriage travel.

The traverse motor 30 is designed to traverse the carriage at a fairly rapid rate, for instance, in the neighborhood of thirteen feet per minute. In setting up the job, the operator may conveniently position the carriage and cutting tool by manipulation of lever 31, and at the end of the cut, the carriage may be returned quickly to its starting position without disturbing the feed box setting. By locating the main motor control switch on the carriage, the headstock spindle may be started, stopped or reversed by the operator at the carriage. This avoids the time loss and inconvenience of having to leave the carriage to control the headstock motor, especially after the headstock gear train has been set up and the cutting operation commenced.

Electric power is transmitted to the carriage by means of a feed rail assembly mounted alongside the lathe bed at the rear, as disclosed in Figure 2. The carriage is provided with a trolley or collector assembly which travels in sliding electrical connection with the feed rail assembly. The switches of levers 31 and 32 are connected to the trolley by means of cables passing from the respective switches, through the carriage saddle, to the trolley at the rear of the carriage. In the present instance, there is provided a series of eight feed rails, five for the main motor and three for the carriage motor respectively. In the case of the main motor, the feed rails carry a control circuit which passes through the switch of lever 32 and back to the control panel of main motor through certain of the feed rails, while the feed rails for the carriage motor carry the power circuit directly. The electrical circuit will be more clearly disclosed hereinafter with reference to the diagram illustrated in Figure 14.

As shown in Figure 2, the main power supply cable for the lathe is indicated at 35. This cable passes into a control box 36 mounted upon the base of motor 28 and from the control box the current is distributed to the several feed rails by means of a cable 37. A cable 38 also extends from control box 36, through the base of the headstock and connected to a jogging button 40 at the front of the headstock (Figure 1), which permits the motor 28 to be energized momentarily to nudge or jog the gear trains of the headstock and feed box for convenience in meshing the gears. The motor 28 further is equipped with a plugging switch 41 which is coupled to the motor shaft and is connected electrically to the control box by means of a cable 42. The plugging switch is of a commercial type which permits the motor to be stopped quickly by reversing the power lines when the motor switch is thrown to "off" position to cause electric braking and to open the circuit when the motor slows to a predetermined speed, to prevent actual reverse rotation. The plugging switch interconnects with a control circuit which incorporates the usual relays and other components to control the direction and speed of the main motor. As previously noted, the main motor is controlled by a secondary or low voltage control circuit and the various electrical components are mounted upon a control panel located in the control box 36. In order to protect the electrical parts and wiring from water, metal particles and dirt, the control box 36 is provided with a waterproof cover 39.

Electric feed rail structure

Figure 11:
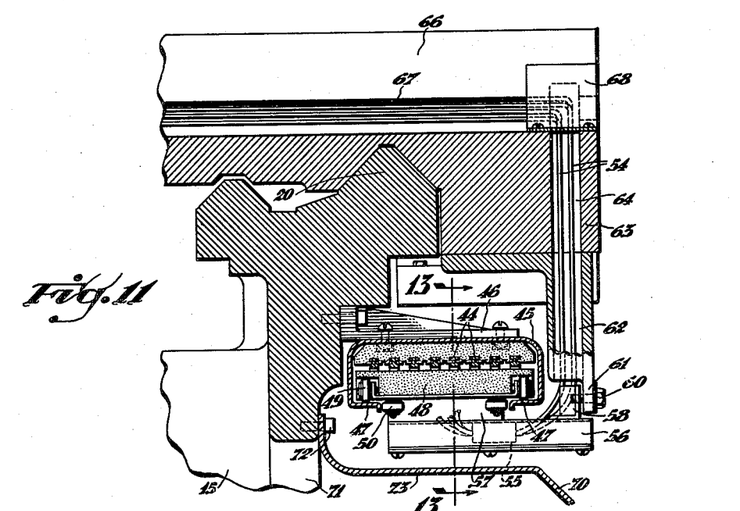
Figure 11 is an enlarged sectional view taken on line 11—11, Figure 2, illustrating the structural details of the electric feed rail and trolley.
Figure 12:
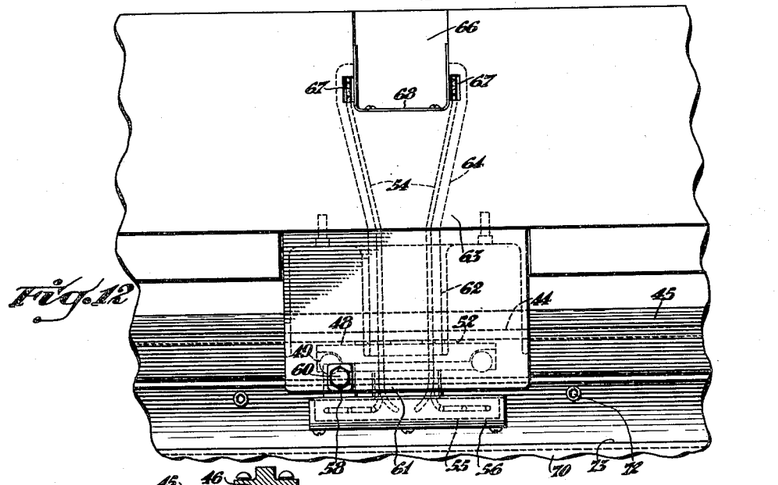
Figure 12 is a fragmentary rear elevation further illustrating the feed rail assembly and trolley associated with the carriage.

From the control box 36, the current is conducted to the feed rail assembly, generally indicated at 43, in which is mounted the feed rails or bus bars 44 (Figure 11). The cable 37 carries individual strands, one for each of the eight bus bars. The bus bars are enclosed in a casing 45 which is co-extensive with the bed and which is secured to the bed by a series of L-shaped brackets 46. The casing 45 is generally U-shaped in cross section, with its open side down, and is provided with horizontal flanges 47—47 bent inwardly at the bottom to provide a bearing support for the trolley or collector assembly 48 which is located inside the casing. The trolley is supported by rollers 49 tracked upon the flanges 47, the rollers being arranged in pairs at opposite ends of the trolley, and the trolley is connected to the carriage to travel therewith in electrical contact with the bus bars. The trolley is guided laterally by means of rollers 50 also arranged in pairs at opposite ends of the trolley and tracking against the inner edges of the respective flanges 47.

Figure 13:
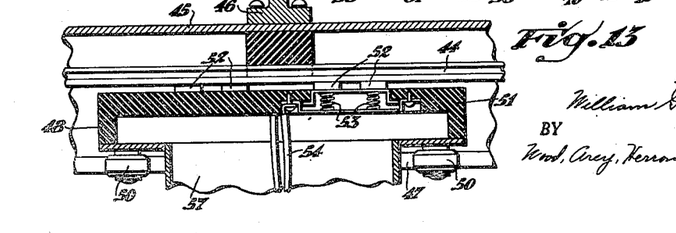
Figure 13 is an enlarged sectional view taken on line 13—13, Figure 11, detailing one of the collector contacts of the trolley.

As shown in Figure 13, the trolley generally constitutes an insulating block 51, provided with a series of contact blocks 52, one for each of the respective bus bars 44. The contact blocks pass upwardly through openings formed in block 51 and are pressed into sliding engagement with the bus bars by means of compression springs 53. An individual cable 54 is in electrical connection with each of the blocks 52 and the cables extend to a terminal block 55 mounted in a housing 56, secured to the bottom of the trolley by vertical tube 57 through which the cables 54 pass. The housing 56 is located beneath the trolley and the tube 57 extends upwardly from the housing between the flanges 47 so that there is no interference with longitudinal translation of the trolley. The outer end of housing 56 includes a lug 58 engaged by a screw 60 passing through the lower lip 61 of a vertical cable chute 62 which is secured to the overhanging portion 63 of the carriage saddle.

The saddle is provided with a vertical passageway 64 opening into the chute 62 so that the cables 54 may pass from terminal block 55, through the housing 56 to the lower end of the cable chute and upwardly into the apron passageway 64.

The upper portion of the saddle is slotted as at 66 to accommodate the cross feed screw in the usual manner. A pair of slots 67—67 is formed in the opposite side walls of slots 66 and these slots communicate with the vertical passageway 64 so that the cables 54 may pass crosswise of the saddle to the carriage switches. A U-shaped clip 68 is secured in the slot 66 at the juncture of slots 67 and passageway 64. The cables 54 pass downwardly into the apron at the forward side of the lathe and are connected to the switches for the main motor and carriage motor. By virtue of the U-shaped bus bar casing 45, the terminal housing 56 and its connector chute 62, the bus bars and cables are protected from moisture such as coolant, which tends to drip from the bed and sometimes splashes from the work during operation of the machine. The opposite ends of the bus bar casing are closed off and the cables 37—38 and 42 preferably are rubber covered to prevent moisture from contacting the wires. The end of the casing 45, through which the cable 37 passes, is provided with appropriate sealing means such as a rubber grommet to prevent the entry of moisture, and similar provision is made for the openings of the control box 36.

As shown in Figures 2 and 11, there is provided, immediately below the feed rail assembly 43, an inclined guard 70 formed preferably of sheet metal and extending over the chip chutes 71. The guard is secured by means of screws 72 to the bed and includes horizontal flange 73 parallel with and spaced downwardly from the feed bar assembly. This arrangement prevents any chips or metallic fragments, particularly unbroken cuttings which twist and curl as they are discharged from the chutes 71, from reaching the feed rails or bus bars 44 to cause short circuits or interference.

Carriage gear train

Figure 7:
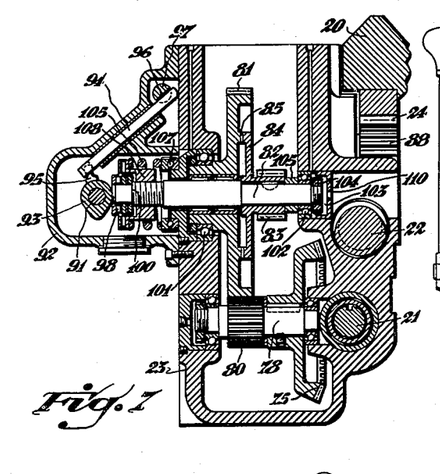
Figure 7 is a sectional view taken on line 7—7, Figure 3, detailing a portion of the gear train of the feed rod, together with the clutch mechanism for coupling or uncoupling the feed rod drive from the apron gear train.

As shown in Figures 3 and 7, the mechanical carriage feed is transmitted from feed rod 21 to a large bevel gear 75 which is selectively driven by a pair of small bevel gears (not shown) in slidable connection with the feed rod 21. These bevel gears are controlled by a direction control lever 77 which alternately meshes or couples them to the large bevel gear 75 so that it may be driven in either direction. Bevel gear 75 is keyed to a shaft 78 journalled in the apron, which includes a pinion 80 (Figure 7). A large gear 81 meshes with pinion 80, gear 81 being loosely journalled on a shaft 82, which is journalled in the apron and includes a pinion 83 keyed thereon. Pinion 83 includes a toothed clutch disk 84 which is arranged to engage the teeth 85 formed in the face of gear 81. When disk 84 is engaged as shown, a driving connection is established with pinion 83 to drive the apron gear train and when disengaged, gear 81 idles and a driving connection may be established with the cross feed screw as hereinafter described. The pinion 83 meshes with a large gear 86 which carries on its shaft 87 a pinion 88. Pinion 88 in turn meshes with the rack 24 secured to the bed of the lathe. It will be apparent therefore, that when the lever 77 is actuated to drive the large bevel gear 75, a driving connection is established from the bevel gear to pinion 80, large gear 81 through the clutch plate 84 to pinion 83. From pinion 83, the drive is transmitted to the large gear 86 and rack pinion 88 to translate the carriage. The clutch disk 84 is controlled by a carriage control lever, as described in connection with the mechanical-electrical interlock mechanism.

Interlock mechanism

In order to prevent interference between the mechanical feed rod drive and the electric carriage feed apparatus, an interlock is provided which alternately locks one control lever in a neutral position when the other is in feeding position. This apparatus is disclosed diagrammatically in Figures 9 and 10. To translate the carriage by operation of the carriage motor 30, the interlock makes it necessary first to disengage the clutch disk 84. Clutch 84 is disengaged by means of the carriage control lever 90 (Figures 3, 4, 9 and 10) which is mounted upon a shaft 91, journalled in a housing 92 secured to the front of the apron. A cam 93 is fixed upon shaft 91 and is arranged to disengage clutch 84 when the handle is depressed as shown in Figure 10. When the control lever 90 is depressed, the clutch plate is moved to the right, away from gear 81 as viewed in Figure 7, and at the same time an interlock plunger 94, which is connected to shaft 91 by an arm or lug 95, is withdrawn from a notch 96 formed in a longitudinal interlock rod 97 which extends to the switch control lever 31. In the position shown in Figure 7, the clutch disk 84 is in its coupling position and the end of interlock plunger 94 is engaged in the notch of rod 97 to prevent operation of the electric switch control lever 31 to prevent motor traverse of the carriage, since the gear train is coupled to the feed rod for mechanical translation.

When control lever 90 is depressed, cam 93, which engages a thrust bearing 98 seated against a shoulder 100 of shaft 82, is rotated to shift shaft 82 to the right as viewed in Figure 7. Large gear 81 is independently journalled on a ball bearing 101 in the apron wall, so that shaft 82 may be shifted while the gear 81 remains stationary. The opposite end of shaft 82 is journalled upon a ball bearing 102 which is slidably supported in a bore 103 formed in the rear wall of the apron. Ball bearing 102 is locked in its longitudinal position by a nut 104 screwthreaded on the end of shaft 82. The opposite side of the bearing is engaged by a spacer 105 interposed between the ball bearing 102 and pinion 83. Thus, the shaft 83, its rearward bearing 102 and the pinion and clutch disk assembly move unitarily relative to the large gear 81 when lever 90 is depressed to uncouple the carriage gear train.

The clutch disk 84 is maintained in engagement with the teeth of gear 81 by means of a coil spring 105 placed under compression between a ball thrust bearing 107 and an adjusting nut 108, threaded upon shaft 83. Thus, when the control lever 90 is depressed, the spring 105 is compressed and when the lever is returned to its normal position, the compression spring returns the shaft and clutch disk into engaging position. The bore 103 for bearing 102 is closed off by means of a closure cap 110 pressed into the bore to prevent the entry of dust and dirt, and clearance is maintained between the cap and bearing to permit the bearing to shift relative to the cap.

Figure 9:
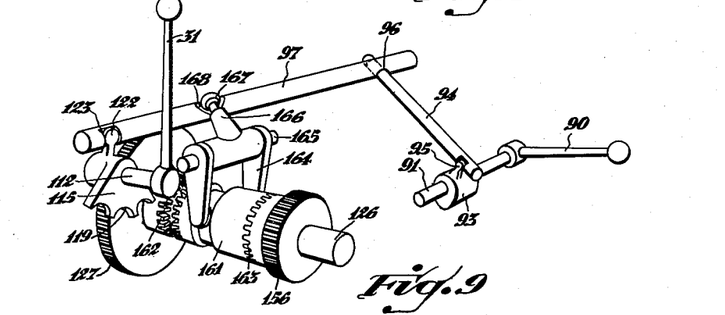
Figure 9 is a diagrammatic perspective view illustrating the interlock mechanism between the mechanical control lever and the electrical control lever, the apparatus being illustrated with the mechanical lever in position for coupling the carriage gear train to the feed rod, with the switch lever locked in its "off" position.
Figure 10:
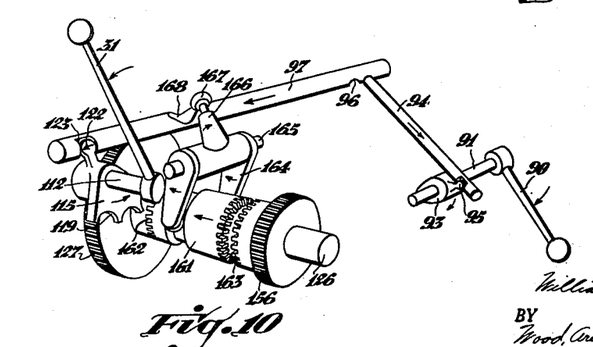
Figure 10 is a view similar to Figure 9, illustrating the apparatus with the mechanical lever locked in its uncoupling position with the switch lever actuated for electric carriage traverse.

As shown in Figures 5, 9 and 10, the control lever 31 for the carriage motor 30 is fixed upon a shaft 112, which is journalled in a housing 113 forming a part of motor 30. The inner end of the shaft is connected to an electrical control switch 114 of commercial design, which controls the operation of the reversible carriage motor 30. Switch 114 is equipped with contacts to energize the motor in forward and reverse directions in accordance with the position of lever 31 and an intermediate or "off" position for de-energizing the motor. A mechanical detent sector 115 is pinned to shaft 112 and a detent arm 116 is pivotally mounted as at 117 adjacent the sector as shown in Figures 3 and 5. A roller 118 is journalled intermediately on arm 116 in position to establish a snap engagement with the semi-circular notches 119 formed in sector 115. A tension spring 120 is connected to the free end of arm 116 and the upper end of the spring is anchored upon a pin 121 secured in the apron. The spring urges the arm 116 and its roller 118 constantly into engagement with the notches to latch lever 31 in its selected position.

When the lever is in its vertical "off" position, as shown in Figures 3 and 9, the contacts of switch 114 are open, and when the lever is swung in either direction from neutral, the appropriate contacts are closed to energize the motor and traverse the carriage in the direction of lever swing. The sector 115 further includes an upwardly extending arm or lug 122 engaged in a slot 123 formed in the interlock rod 97. It will be apparent that actuation of lever 31 will shift the interlock rod longitudinally and when the carriage feed control lever is in its gear coupling position, as shown in Figure 10, the interlock plunger 94, bisecting and engaging the notch 96, will lock the sector 115 and switch 114 in a neutral or "off" position.

As shown in Figures 3, 4, 5 and 6, the large gear 86, keyed to shaft 87 which also carries the rack pinion 88, meshes with a pinion 125 carried by a shaft 126 journalled in the apron. Shaft 126 further includes a large gear 127 meshing with the pinion 128 of a compound gear 129, loosely journalled on an idler shaft 130 mounted in the walls of the apron. A large gear 131 forms a part of the compound gear 129, and a pinion 132, which is fixed to a section of the motor shaft 133, meshes with the gear 131. Thus, a gear train is established from motor pinion 132, large gear 131 pinion 128 to drive the large gear 127. Gear 127 in turn drives pinion 125 to drive the large gear 86 and rack pinion 88 to traverse the carriage. Therefore, when carriage traverse motor 30 is energized, the carriage is translated through the same gear 86 and rack pinion 88 as when it is translated by power from the feed rod 21. By virtue of the interlock apparatus however, the apron gear control lever 90 must first be placed in the inoperative position shown in Figure 10. Thus, the apron gear train, including the gear 86 and pinion 83, is free to idle with respect to the gear 81, since the clutch disk 84 is uncoupled from the teeth 85 by operation of the control lever 90.

Referring to Figure 5, there is provided on the motor shaft section 133, a coupler 135 which connects the motor shaft 136 to the shaft section 133. Coupler 135 constitutes a disk 137 splined to shaft 133 and including a series of screws 138. A mating disk 140 is slidably mounted upon splined end of the motor shaft 136. A pressure ring 141, engaged by compression springs 142, carried by the screws 138, is disposed on the opposite side of disk 140. Nuts 143 are engaged on the outer ends of the screws 137 to seat the outer ends of the compression springs. Friction plates 145—145 are interposed respectively between the disk 137 and disk 140 and between disk 140 and the pressure ring 141 to establish a frictional engagement with the disk by virtue of the compression springs 142. Disk 140, splined to motor shaft 136, therefore is frictionally engaged between disk 137 and pressure ring 141 which forms an assembly to transmit the motor torque. The friction coupling prevents overloading of the gear train and motor by permitting slippage or relative rotation between the motor shaft 136 and drive shaft 133 should there be any obstruction to prevent traverse of the carriage or apron gear train.

Figure 6:
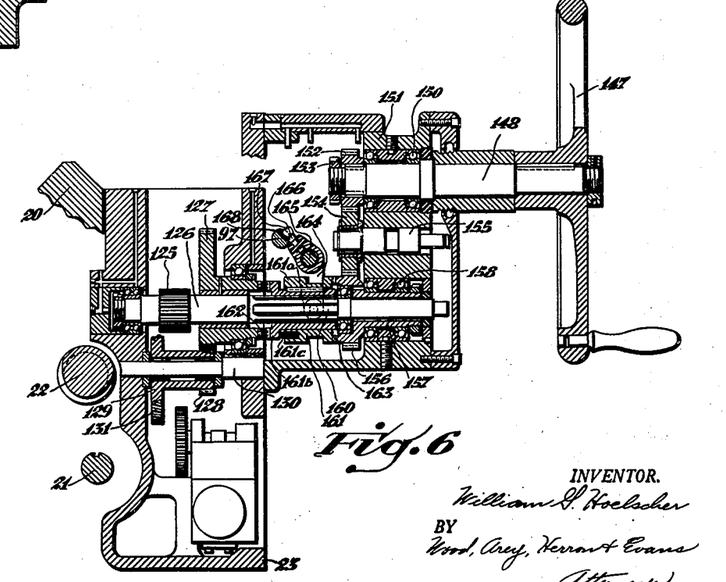
Figure 6 is a developed sectional view taken on line 6—6, Figure 3, illustrating the handwheel gear train, a portion of the electric motor gear train and the clutch collar for alternately coupling the handwheel or motor gear train to the apron gear train.

The lathe carriage further is provided with a handwheel 147 for manual feed adjustment independently of the mechanical or electric power means (Figure 6). Handwheel 147 is keyed upon a shaft 148 loosely journalled upon ball bearings 150 mounted in a casing 151. To the inner end of shaft 148 is keyed a gear 152 secured against endwise displacement by a nut 153. Gear 152 meshes with an idler gear 154 loosely journalled upon an idler shaft 155. Idler gear 154 meshes with a gear 156 forming a part of a sleeve 157 which is mounted co-axially with the shaft 126 and is journalled in ball bearigs 158 seated in the casing 151. The gear 156 therefore is free to rotate loosely relative to shaft 126. Shaft 126 includes a splined portion 160 upon which is slidably mounted a clutch collar 161 having clutch teeth at opposite ends adapted to alternately establish a coupling engagement with clutch teeth 162 formed in the hub of gear 127 of the motor gear train, and teeth 163 formed in the hub of gear 156. When the clutch collar is in the right hand position shown in Figure 6, corresponding to the setting shown in Figure 9, the clutch collar couples the handwheel gear train to shaft 126, causing the handwheel to rotate with carriage feed. When the clutch collar is shifted left, as in Figure 10, the gear 127 of the carriage motor is coupled to shaft 126 and the handwheel is uncoupled. Clutch collar 161 is shifted by means of a yoke 164 loosely mounted upon a shaft 165. Yoke 164 includes an angular lever 166 upon which is loosely journalled a roller 167 engageable with a notch 168 formed in the interlock rod 97.

It will be apparent in Figure 10, that when the switch lever 31 is shifted either to the right or left to energize the carriage motor, roller 167 will ride up the inclined sides of notch 168 to cause the clutch collar 161 to be shifted to the left, as viewed in Figures 6 and 10. When the switch lever is in the neutral position, as illustrated in Figures 6 and 9, the clutch collar 161 will be maintained in its right hand position by virtue of the tension spring 169 (Figure 4), to establish a driving engagement with the handwheel gear 156. Thus, the handwheel gear train is coupled to shaft 126 when the lever 90 is in its elevated position to establish a driving connection with the feed rod 21. This permits the handwheel to rotate during feed rod translation of the carriage. However, when it is required to adjust the carriage by the handwheel 147, it is necessary first to place the direction control lever 77 in a neutral position, as shown in Figure 3, so that the apron gear train is uncoupled from the feed rod 21. When the handwheel is operated in this manner, the apron gear train, back to the bevel gear 75, idles and when the lever 77 is in position to couple the feed rod to the bevel gear, the handwheel will rotate during carriage translation.

When the motor traverse lever 31 is swung from neutral to either of its operating positions for electric traverse of the carriage, the clutch collar 161 will be shifted to the left to uncouple the teeth 163 of gear 156 so that the handwheel may remain stationary. In its left hand position, the teeth of clutch collar 161 engage the teeth 162 of gear 127 to couple gear 127 to shaft 126, as above noted. This establishes the drive to pinion 125 which drives gear 86 and rack pinion 88. Thus, in one position, the clutch collar 161 couples the handwheel to the apron gearing and disconnects the motor gear train from the apron gear train, and in the second position, for electric traverse, it connects the motor gear train to the apron gear train and uncouples the handwheel. This constitutes a safety feature, since the relatively high speed electric traverse otherwise would cause the handwheel to rotate at a speed which may endanger the operator. In addition, the uncoupling makes it unnecessary to rotate the motor gear train and motor when the carriage is being adjusted, thus decreasing the load and making the handwheel adjustment more convenient.

When motor traverse lever 31 is swung from neutral, the coupling collar 161 must be free to shift to the left, by reason of the positive engagement of the notch 168 of interlock rod 97, by the roller 167 of the shifter yoke 164. In other words, should the clutch teeth 162 of gear 127 jam against the teeth of the coupler, it would be impossible to shift the interlock rod and the traverse lever 31 would be locked in neutral. In order to prevent this, the coupler 161 is of sectional form, constituting an outer sleeve 161a telescopically engaged upon an inner sleeve 161b, which is splined to shaft 126. Sleeve 161a is slidably keyed with respect to sleeve 161b and a series of compression springs 161c is interposed between the two sleeves. Should the teeth of sleeve 161b jam against the teeth 162 of gear 127 when the switch lever 31 is actuated, the sleeve 161a, which is engaged by yoke 164, will shift to the left relative to the inner sleeve 161b, compressing the springs 161c. As soon as the carriage motor 30 is energized and gear 127 begins to rotate, the springs 161c will cause the teeth of inner sleeve 161b to snap into engagement with the clutch teeth 162 of the gear.

The sleeve 161 is shifted in its right hand direction by means of the tension spring 169 (Figure 4) so that when the switch lever 31 is returned to neutral position, the tension spring draws the coupler and its yoke to the right, causing the roller 167 to reenter slot 168, and drawing the clutch teeth into engagement with teeth 163 of gear 156 by spring tension. Should these clutch teeth jam, the teeth will snap into engagement as soon as gear 156 begins to rotate.

The carriage further is provided with a tool slide, indicated generally at 170 (Figure 3), which is shifted transversely by means of a cross feed screw 171. A handwheel 172 is secured upon the end of screw 171 for hand adjustment of the tool slide and cutting tool to adjust for work diameter. A gear train also is provided for power operation of the feed screw and cross slide. For this purpose there is provided a pinion 173 carried upon a shaft 174 and meshing with the gear 81 of the apron gear train. Pinion 173 is adapted to be coupled to a large gear 175, also journalled upon shaft 174. Gear 175 meshes with an idler gear 176 (Figure 3) which in turn meshes with a pinion 177 secured to the cross feed screw shaft 171. A clutching arrangement, similar to that disclosed with reference to carriage control lever 90, is provided between the gears 173 and 175 so that the gear 175 may be coupled to gear 173 when it is desired to shift the tool slide by power.

A lever 178, journalled in a housing 180, is provided for this purpose. The lever includes a cam and throwout bearing, similar to that previously described. In order to operate the cross slide by power, the carriage control lever 90 first is depressed to disconnect the carriage gear train and prevent carriage feed, lever 178 is actuated to couple gear 173 to gear 175 and the direction control lever 77 is moved from its neutral position in the direction to rotate the cross feed screw in the desired direction. In this setting, large gear 81 remains coupled to the pinion 80 to drive cross feed gear 173 and the balance of the cross feed gear train, but since clutch plate 84 is uncoupled from gear 81, the carriage gear train is not driven. After the desired tool slide adjustment is made, cross feed control lever 178 is moved to its neutral position to uncouple the gears 173 and 175 so that the carriage may be translated without actuating the cross feed screw gear train.

Figure 8:
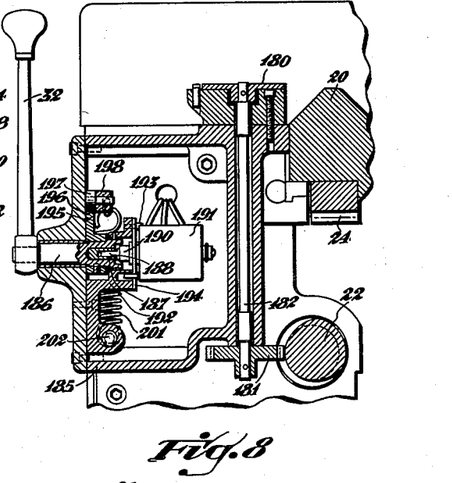
Figure 8 is a sectional view taken on line 8—8, Figure 3, detailing the main motor control switch and its operating mechanism.

When it is desired to feed the carriage from the lead screw 22, the lead screw lever 25 is actuated to engage a split nut (not shown) with the threads of the lead screw. As shown in Figure 8, a thread indicator dial 180 is provided. The structure includes a gear 181 meshing with the threads of lead screw 22, connected by a shaft 182 to the dial 180. Thus, the dial is rotated in accordance with lead screw rotation and is provided with suitable index marks to indicate when the full thread of the lead screw is in position for engagement by the split nut.

*Main motor control lever*

As shown in Figures 3 and 8, the main motor switch for controlling the headstock motor 28, is actuated by the lever 32, fixed upon a shaft 186, journalled in a switch housing 185, which is secured at the right hand end of the carriage. The inner end of shaft 186 includes a socket member 187 adapted to telescopically engage the flattened end 188 of the actuating shaft 190 of switch 191. Switch 191 has three positions, consisting of an "off" or neutral position, and a forward and reverse position. The switch may be of any suitable commercial design and is secured to a bracket 192 by means of screws 193 passing through a mounting plate 194 secured to the switch. The position of lever 32 and the switch is regulated by a detent sector 195 having three semi-circular notches 196 engageable by a roller 197 journalled on an arm 198. The arm is pivotally mounted as at 200 to the mounting bracket 192, and the swinging end of the lever is engaged by a tension spring 201 having its lower end anchored upon a pin 202 secured in the lower portion of bracket 192.

As shown, the switch is in its neutral or "off" position and may be swung in either direction for forward and reverse operation of the main headstock motor. In the present instance, the main motor is controlled by a secondary low voltage control circuit, the switch 191 being connected by means of the cables 54 which extend through the saddle from the trolley to the switch and back to the trolley. From the trolley, an electric circuit is established to the control box through the feed rails 44 to control motor operation, as hereinafter described with reference to the electrical circuit. From the foregoing, it will be apparent that lathe operation may conveniently be controlled from the carriage. After adjusting the headstock and feed box transmission for the desired spindle speed and carriage feed, the operator need not leave the carriage but is able to control operation and direction of spindle rotation by actuating lever 32 in the appropriate direction, and is able to stop the spindle quickly should an emergency arise. By virtue of the carriage rapid traverse lever, interlocked with the mechanical carriage feed mechanism, the carriage may conveniently be traversed without disturbing the feed box setting merely by depressing carriage control lever 99 and swinging the rapid traverse lever 31 in the desired direction.

*Electrical circuit*

Figure 14:
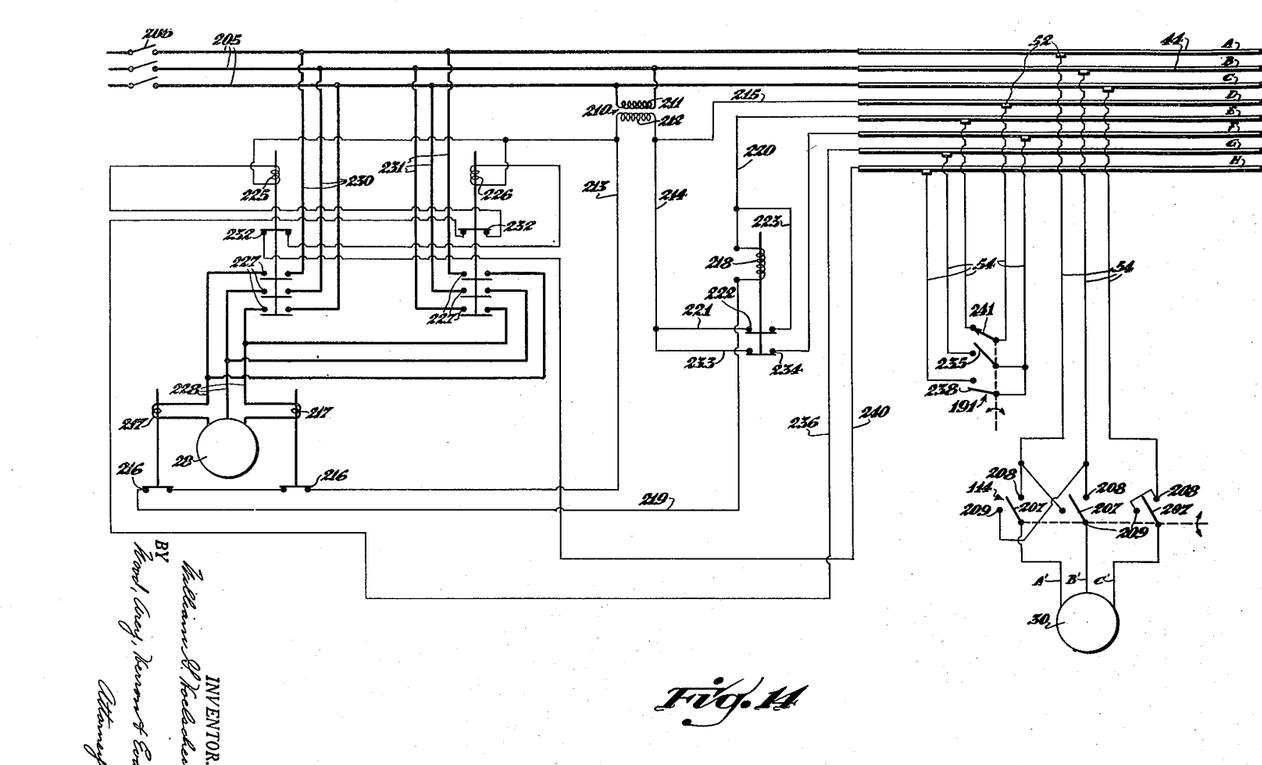
Figure 14 is an electrical diagram illustrating generally the circuit established between the control switches, carriage motor and main motor.

A generalized diagram of the electrical circuit is illustrated in Figure 14, omitting for purposes of simplicity a number of main motor control circuits and components which are not pertinent to the present invention. In the present instance, the main motor and carriage motor both are of the three phase A. C. reversible type, energized by the main power lines 205. A main switch 206 is provided in the main lines for shutting down the entire electrical system. In general, the main motor 28 is controlled by a secondary circuit while the carriage motor 30 is controlled directly by its reversing switch 114. For the carriage motor, the power lines 205 are connected directly to three of the feed rails designated at A, B, and C. A connection is established directly from these feed rails by means of the cables 54, extending from the trolley to the reversing switch 114 and from the switch to the motor. As indicated diagrammatically, the reversing switch embodies three movable contact arms indicated at 207. These arms are connected together mechanically for unitary movement and, as indicated, they swing relative to two sets of contacts 208 and 209. Since switch 114 has a neutral or "off" position, the switch arms are disclosed in this position in the diagram. When the arms are swung into engagement with the contacts 208 for forward operation of the motor, the main lines A, B, and C, are connected directly to motor lines A', B', and C'. When the switch is actuated to swing the arms in the opposite direction into engagement with contacts 209, the main line A is connected to motor line B', main line B is connected to motor line A', and main line C is connected to motor line C' to cause motor operation and carriage traverse in the reverse direction.

The feed bars, D to H inclusive, carry the secondary control circuit for the main motor control. For this purpose a transformer 210, which is located in the control box 36, has its primary winding 211 connected across two of the main power lines 205. The secondary winding 212 has its opposite terminals connected to lines 213 and 214. The feed rail D is connected directly to line 214 by means of a line 215. The other low voltage line 213 passes through the normally closed contacts 216 of the main motor overload relays 217—217 to the winding of a relay 218 and thence to the feed rail E by way of line 220. Thus, feed rails D and E supply the voltage to the main motor control switch 191 located in the carriage. It will be apparent that if the motor is overloaded, the relays 217 will deenergize the control circuit until the overload condition is corrected. The relay 218 also includes a holding circuit which is established from line 214, through line 221, through contacts 222 of relay 218, through line 223 to line 220, thus connecting line 214 to the upper end of the relay winding. Once having been closed, relay 218 thus will remain locked in so long as the overload relays 217 are not tripped.

The power circuit to main motor 28 is completed from the lines 205 either through the forward relay 225 or the reverse relay 226. These relays each include three main power contacts 227 by means of which the three motor leads 228 are connected to the power lines 205. Three phase power lines 230 and 231 connect the respective forward and reverse relays to the main lines 205. When the forward relay 225 is energized and its contacts closed, the power lines 230 will be connected to the motor leads 228 through the switch contacts 227. When the reverse relay 226 is energized, the power lines 231 will be connected to the motor lines 228 through the contacts 227 of relay 226. The respective lines 230 and 231 are appropriately connected to the power lines 205 to cause forward and reverse operation of the main motor.

An electrical interlock is provided between the forward and reverse relays by means of the contacts 232—232 on the respective relays. These contacts are interconnected with the lines to the windings of the forward and reverse relay in such manner that the circuit to the forward relay is interrupted when the reverse relay is energized and its interlock contacts 232 are opened, and the circuit to the reverse relay is interrupted when the forward relay is energized. These relays also may be provided with a mechanical interlock for safety reasons if desired.

The forward and reverse relays are controlled by the main motor control switch 191 at the carriage in the following manner. The control voltage is supplied from line 214 through line 233 to contact 234 of relay 218 and from contact 234 to feed rail F. The main motor control switch includes a forward contact 235 which is in electrical connection with feed rail F by means of cable 54 which extends from the trolley through the saddle to the switch. From the opposite side of forward contact 235, a cable 54 extends to the feed rail G. Therefore, when forward contact 235 is closed, current is supplied from the low voltage line 114 through relay contact 234, line 233 to feed rail F. From feed rail F the current passes through cable 54, through forward contact 235 to feed rail G, through the opposite cable 54. From feed rail G, a line 236 is extended to one terminal of the coil of forward relay 225. The opposite terminal of the coil is connected to line 213 to complete the circuit. It is to be noted that the line 236 branches through the interlocking contacts 232 of the reverse relay 226 to prevent the forward relay from being energized if the reverse relay is energized and its interlock contact 232 open.

The reverse contact 238 of main motor control switch 191, is connected to the feed rail F through the same cable 54 which serves the forward contact 235. The cable 54 extends from the opposite side of the reversing switch to the feed rail H. Feed rail H is connected by means of the line 240 which extends to the coil of reversing relay 226, passing through the interlocking contact 232 of the forward relay 225, as previously described with reference to the forward relay. The opposite terminal of the coil of the reversing relay likewise is connected to the secondary voltage line 213. When reversing contact 238 is closed, current flows from control voltage line 214 through contact 234 of relay 218, line 233 to feed rail F, through cable 54 and to the reversing contact 238. From contact 238 the current passes to feed rail H to line 240 through interlocking contact 232 of forward relay to the winding 226 of the reversing relay to line 213 to complete the circuit. This closes the contacts 227 of the reverse relay to energize the main motor 28 is reverse.

The main motor control switch includes a third contact 241. This contact is connected to the feed rail D by means of a cable 54. When the switch is in neutral or "off" position, as illustrated, the contact 214 is closed so that a circuit is established from feed rail D to feed rail E. Feed rail E is in electrical connection with the coil of relay 218 to energize the relay to close the previously noted contacts 222 and 234. The circuit for relay 218 extends from the supply line 214, feed rail D through contact 241 to feed rail E, through the coil of switch 218 by way of line 220 to the contacts 216 of the overload relays by way of line 219 to the opposite supply line 213. As previously noted, the relay 218 is provided with the holding contacts 222 so that the relay remains closed to supply current to feed rail F after the control switch is thrown to forward or reverse position, which opens the contact 241. However, should the main motor be overloaded, the overload relay contacts 216 will open causing the coil of relay 218 to be deenergized, opening contacts 222 and 234. When contact 234 is opened, the feed rail F is deenergized making the forward and reverse switches 235 and 238 inoperative. Thus, it is necessary to correct the overloading to permit the overload relays to close before it is possible to energize the main motor forward and reverse relays.

It will be noted that the forward and reverse contacts 235 and 238 and the contact 241 for relay 218 are connected together for unitary operation and that when the switch is operated to close either the forward or reverse contacts, contact 241 will be opened leaving relay 218 energized through its holding circuit. Thus, relay 218 remains energized only so long as the overload relays are not tripped.

As previously noted, the control circuit and its components are located within the terminal box 36 which includes further electrical apparatus for the plugging switch 41 by means of which the main motor is braked electrically. The circuit further includes an accelerating and time delay apparatus by means of which the voltage to the main motor is applied gradually. As noted, these various circuits are well understood by those skilled in the art and have been omitted from the present disclosure since they form no part of the present invention.

Since the power circuit for the carriage motor is fed directly to the feed rails A, B, and C, the circuit is simplified and the number of feed rails is kept to a minimum. By locating the various control components of the main motor in the control box 36 and controlling the circuit through the medium of the feed rails and main motor control switch 191, the structure is greatly simplified and the main motor may be controlled by a relatively light-weight compact switch mounted directly upon the carriage.

Having described my invention, I claim:

1. In a lathe, a bed, a carriage slidably mounted on the bed, a gear train in said carriage for feeding the same relative to the bed, a power shaft extending along the bed and in driving connection with said gear train, a two-position control lever for coupling or uncoupling the gear train relative to said power shaft, a carriage traverse motor mounted on said carriage, a switch for controlling said motor, a three-position lever for said switch mounted on the carriage, and a slidable interlock rod extending between said gear train control lever and the switch lever, said interlock rod being connected to said three-position lever adapting the rod to be shifted upon actuation of the lever, said interlock rod being constructed and arranged to lock one of said levers in an inoperative position when the other is in an operative position.

2. In a lathe or the like, a bed, a carriage slidably mounted on the bed, driving mechanism associated with the carriage for feeding the carriage along the bed, a handwheel on the carriage arranged for manually feeding the carriage along the bed, a reversible motor arranged for traversing the carriage along the bed independently of said driving mechanism, a pair of control levers on said carriage adapted respectively to control said reversible motor and said driving mechanism, an interlock interconnecting said control levers, arranged to lock the levers against simultaneous operation, and a shiftable coupler for said handwheel connected to said interlock and arranged to disconnect said handwheel to prevent rotation of the same when said reversible motor is energized and to connect the hand wheel when the motor is deenergized whereby the carriage may be fed either by the carriage driving mechanism or by the hand wheel when the control lever for the reversible motor is in an inoperative position.

3. In a lathe, a bed, a carriage slidably mounted on the bed, an apron gear train in said carriage for feeding the same longitudinally along the bed, a power shaft extending along the bed and in driving connection with said apron gear train, a two-position control lever for coupling or uncoupling the apron gear train relative to the power shaft, a carriage rapid traverse motor mounted on said carriage, a switch for controlling said motor mounted on the carriage, a three-position switch lever connected to said switch and a slidable interlock rod extended between said apron gear train control lever and the rapid traverse control lever alternately to lock one of said levers in an inoperative position when the other is in an operative position.

4. In a lathe having a bed, a carriage slidably mounted on the bed, a gear train including a clutch for feeding the carriage and a reversible rapid traverse motor adapted to feed the carriage, an interlocked control system for feeding the carriage selectively by gear train or traverse motor operation, said control system comprising, a two-position clutch lever adapted to couple or uncouple said clutch, a three-position switch connected to the traverse motor for driving the same in either direction and having an intermediate deenergized position, a three-position switch lever connected to said switch, said switch lever having an intermediate position corresponding to the deenergized switch position, a slidable interlock rod connected to the three-position switch lever and adapted to be shifted upon operation of said lever, the interlock rod being extended to the two-position clutch lever, and locking means extended between the clutch lever and interlock rod, said locking means being adapted to lock the interlock rod and switch lever in the intermediate position when the clutch lever is shifted to coupling position and being adapted to lock the clutch lever in uncoupled position when the switch lever is shifted from said neutral to a motor energizing position.

5. In a lathe having a bed, a carriage slidably mounted on the bed, a gear train including a clutch for feeding the carriage and a reversible rapid traverse motor adapted to feed the carriage, an interlocked control system for feeding the carriage selectively by gear train or traverse motor, said control system comprising, a two-position clutch lever adapted to couple or uncouple said clutch, a switch connected to the traverse motor for driving the same in either direction and having an intermediate deenergized position, a three-position switch lever connected to said switch, said switch lever having an intermediate position corresponding to the deenergized switch position, a slidable interlock rod connected to the three-position switch lever and adapted to be shifted in either direction upon operation of said lever, the interlock rod being extended to the two-position clutch lever and having a notched portion adjacent said lever, a slidable interlock plunger connected to the two-position clutch lever, said interlock plunger being angularly related to the interlock rod and being adapted to engage said notch and lock the interlock rod and switch lever in the intermediate position when the clutch lever is shifted to coupling position.

6. In a lathe having a bed, a carriage slidably mounted on the bed, a gear train including a clutch for feeding the carriage and a rapid traverse motor adapted to feed the carriage, an interlocked control system for feeding the carriage selectively by gear train or traverse motor, said control system comprising, a clutch lever adapted to couple or uncouple said clutch, a switch connected to the traverse motor for driving the same in either direction, a switch lever connected to said switch, said switch lever having an intermediate position, a slidable interlock rod connected to the switch lever and adapted to be shifted upon operation of said lever, the interlock rod being extended to the clutch lever and having a notched portion adjacent said lever, a slidable interlock plunger having an end connected to the two-position clutch lever, said plunger being angularly related to the interlock rod, said notch being arranged to move into alignment with the interlock plunger when the switch lever is shifted to said intermediate position, the outer portion of the interlock plunger being adapted to engage said notch and lock the interlock rod and switch lever in the intermediate position when the clutch lever is shifted to coupling position, the outer end of the interlock plunger being adapted to be retracted clear of the interlock rod when the clutch lever is shifted to uncoupling position, whereby shifting of the interlock rod by movement of the switch lever from the intermediate position will disalign said notch relative to the interlock plunger and thereby lock the clutch lever in disengaged position.

7. In a lathe having a bed, a carriage slidably mounted on the bed, a gear train including a clutch for feeding the carriage, a reversible rapid traverse motor adapted to feed the carriage, and a hand wheel and driving system for feeding the carriage manually, an interlock control system for feeding the carriage selectively by gear train, traverse motor, or hand wheel operation, said control system comprising, a two-position clutch lever adapted to couple or uncouple said clutch, a switch connected to the traverse motor for driving the same in either direction and having an intermediate deenergized position, a three-position switch lever connected to said switch, said switch lever having an intermediate position corresponding to the deenergized switch position, a slidable interlock rod connected to the three-position switch lever and adapted to be shifted upon operation of said lever, the interlock rod being extended to the two-position clutch lever, locking means cooperating between said interlock rod and clutch lever operable to lock the clutch and switch levers against concurrent shifting to motor energizing and clutch coupling positions, a two-position shiftable clutch associated with said hand wheel, said clutch being adapted to couple the handwheel with respect to said driving system and thereby provide carriage feeding upon rotation of the handwheel, and means associated with the interlock rod operable to shift the clutch to said coupled position when the switch lever is in the intermediate position, whereby manual rotation of the hand wheel or actuation of said clutch lever will cause feeding of the carriage.

8. In a lathe having a bed, a carriage slidably mounted on the bed, a gear train including a clutch for feeding the carriage, a traverse motor adapted to feed the carriage, and a hand wheel including a gear train for feeding the carriage manually, an interlocked control system for feeding the carriage selectively by gear train, traverse motor, or hand wheel operation, said control system comprising, a clutch lever adapted to couple or uncouple said clutch, a switch connected to the traverse motor, a switch lever connected to said switch, said switch lever having an intermediate deenergizing position, a slidable interlock rod connected to the switch lever and adapted to be shifted upon operation of the switch lever, the interlock rod being extended to the clutch lever and having a notched portion adjacent said lever, an interlock plunger connected to the clutch lever, said plunger being angularly related to the interlock rod and being adapted to engage said notch and lock the interlock rod and switch lever in the intermediate position when the clutch lever is shifted to coupled position, a shiftable clutch sleeve associated with said hand wheel gear train, spring means urging the sleeve in coupling position, a yoke for shifting said clutch sleeve to uncoupling position, the interlock rod including a second notch providing a cam surface and said yoke including a lever adapted to engage said cam surface whereby the clutch sleeve is shifted by the spring means to coupled position when the switch lever is in the intermediate position with said first notch in alignment with the interlock plunger and the second notch in alignment with the yoke lever, whereby either manual rotation of the hand wheel or shifting of the clutch lever to coupling position will cause feeding of the carriage, said second notch being adapted to shift the yoke and clutch sleeve to an uncoupling position when the switch lever is moved in either direction from said neutral position with the clutch lever in uncoupled position.

9. In a lathe having a bed, a carriage slidably mounted on the bed, an apron gear train including a clutch for feeding the carriage, a feed rod for driving the apron gear train, a rapid traverse motor and a hand wheel for feeding the carriage independently of the feed rod, an interlocked control system for feeding the carriage selectively by apron gear train, traverse motor or hand wheel operation, said control system comprising a two-position clutch lever for regulating said clutch, a switch for the motor, a three-position switch lever for operating the switch, a shaft having a pinion driving the apron gear train independently of the feed rod and thereby feeding the carriage upon rotation of the shaft, a gear train extending from the hand wheel to said shaft for driving the shaft upon rotation of the hand wheel, a traverse motor gear train extending from the traverse motor to said shaft for driving the shaft upon operation of said motor, a two-position clutch collar slidably keyed to said shaft, said clutch collar being adapted to establish a driving connection from said hand wheel gear train to said shaft in one position and to establish a driving connection from the traverse motor gear train to said shaft when shifted to a second position, a clutch yoke for shifting the clutch collar to either of said positions, a slidable interlock rod connected to the switch lever and adapted to shift the yoke and clutch collar to a position establishing a driving connection with the hand wheel gear train when the switch lever is in the intermediate position whereby the hand wheel gear train is operable to drive the apron gear train and feed the carriage upon rotation of the handwheel, said interlock rod being adapted to uncouple the hand wheel and establish the driving connection from the traverse motor gear train to said shaft when the switch lever is shifted from said intermediate position.

10. In a lathe having a bed, a carriage slidably mounted on the bed, an apron gear train including a clutch for feeding the carriage, a rapid traverse motor for feeding the carriage and a hand wheel for feeding the carriage manually, an interlocked control system for feeding the carriage selectively by gear train, traverse motor or hand wheel operation, said control system comprising a clutch lever for regulating said clutch, a switch for the motor, a switch lever for operating the switch, having an intermediate motor deenergizing position, a hand wheel gear train extending from the hand wheel and adapted to feed the carriage upon rotation of the hand wheel, a second gear train extending from the traverse motor and adapted to feed the carriage upon operation of said motor, a shaft common to both of said gear trains and in driving connection with the apron gear train, a two-position clutch collar slidably keyed to said shaft and adapted to establish a driving connection from said hand wheel gear train to said shaft in one position and adapted to establish a driving connection from the traverse motor gear train to said shaft when shifted to said second position, a clutch yoke for shifting the clutch sleeve, the clutch yoke having an actuating arm, a slidable interlock rod connected to the switch lever, and a cam surface on said interlock rod engaging the arm of said clutch yoke, said cam surface being adapted to shift the yoke and clutch collar to a position engaging the hand wheel gear train when the switch lever is in the intermediate position and to shift the clutch sleeve into a position engaging the traverse motor gear train when the switch lever is shifted from the intermediate position.

WILLIAM G. HOELSCHER.

REFERENCES CITED

The following references are of record in the file of this patent:

UNITED STATES PATENTS

| Number | Name | Date |
|---|---|---|
| 1,429,025 | Dunbar | Sept. 12, 1922 |
| 1,477,186 | Randolph | Dec. 11, 1923 |
| 1,477,480 | Groene | Dec. 11, 1923 |
| 1,968,255 | Lewis | July 31, 1934 |
| 2,113,363 | Amidon | Apr. 5, 1938 |
| 2,171,271 | Johnson | Aug. 29, 1939 |
| 2,462,498 | Himoff et al. | Feb. 22, 1949 |